Dec. 3, 1963     C. R. SEAWARD     3,113,094

ELECTRODEPOSITION CELL

Filed Nov. 23, 1959

INVENTOR.
CARL R. SEAWARD

BY *John F. Cullen*

ATTORNEY 3,113,094
ELECTRODEPOSITION CELL
Carl R. Seaward, Amsterdam, N.Y., assignor to General
Electric Company, a corporation of New York
Filed Nov. 23, 1959, Ser. No. 854,704
6 Claims. (Cl. 204—206)

My invention relates to electrodeposition cells and, more particularly, to electrodeposition cells employed in processes for producing durable, flexible, electrically insulated conductors which are adapted to operate in an elevated high temperature range of over 500° C.

It is known that refractory dielectric materials are of value in the insulation of electrical conductors. Conductors coated with these materials have excellent dielectric properties but have very poor mechanical characteristics. As a result, dielectric coatings are broken or weakened in ordinary usage, causing failure of the equipment in which they are used. The brittleness and fragility of these products offset the desirable electric characteristics thereof. In order to overcome the foregoing disadvantages, various modifications have been introduced into processes whereby refractory coated conductors have been produced.

Development of components for advanced aircraft and missile propulsion systems created a further problem of providing electrically insulated conductors which will operate in an elevated temperature range of over 500° C. Under other conditions, the electrically insulated conductor must function effectively while exposed to high levels of nuclear radiation in high ambient temperatures. Previous solutions for providing durable, flexible, electrically insulated conductors were not generally satisfactory for operation above about 300° C. because these previous conductors employed an organic material to retain the inorganic insulation in place.

An improved electrically insulated conductor adapted to operate at temperatures in excess of 500°, apparatus and a process for producing such a conductor are disclosed and claimed in my copending patent application entitled, "Electrically Insulated Conductor and Production Thereof," Serial Number 726,267, filed April 3, 1958, now abandoned, and assigned to the same assignee as the present application. An improved process for producing an electrically insulated conductor adapted to operate at temperatures in excess of 500° C. is also disclosed and claimed in my copending patent application entitled, "Process for Producing an Electrically Insulated Conductor," Serial Number 759,915, filed September 9, 1958, Patent No. 3,034,971, and assigned to the same assignee as the present application.

In both of the above-entitled patent applications, a layer of chromium is deposited on the surface of an electrical conductor in an electrodeposition cell. The present invention provides an improved electrodeposition cell which produces a substantially pure chromium layer on an electrical conductor. Such cell is particularly suitable for use in the above-identified processes.

Accordingly, it is an object of the present invention to provide an improved electrodeposition cell which reduces substantially metallic contamination of the resulting chromium deposit.

It is another object of the invention to provide an electrodeposition cell with an anode assembly having at least one metallic sheet and a plurality of metallic plates affixed generally perpendicular to the sheet to produce a uniform chromium deposit on another metallic structure, such as a conductor.

It is another object of the invention to provide an improved electrodeposition cell which produces a rapid and efficient plating process.

It is a further object of the invention to provide an improved electrodeposition cell with a plurality of insulated cathode pulleys with exposed rim grooves mounted on electrically conductive and surface insulated power-driven shafts to eliminate bearing corrosion and interference with current flow between shafts and pulleys.

In carrying out my invention in one form, an improved electrodeposition cell comprises an insulated tank adapted to contain a plating bath, a plurality of insulated bearings mounted in the tank and spaced from each other, an electrically conductive and surface insulated shaft mounted rotatably in each of the bearings, a plurality of electrically conductive and surface insulated pulleys with exposed rim grooves mounted alternately on each shaft, an anode assembly positioned between the shafts, the anode assembly comprising of at least one electrically conductive sheet, a plurality of electrically conductive plates affixed generally perpendicular on at least one surface of each of the sheets and adapted to provide passages between adjacent plates, the plates positioned to align each passage with a pair of spaced pulleys, the pulleys adapted to convey a conductor through the plating bath in said tank, a slip ring positioned on each of the shafts, driving means for at least one of said shafts, a collector brush positioned adjacent to each slip ring and in contact therewith, a power source, and electrical circuit means connecting the collector brushes and the anode assembly with the power source.

These and various other objects, features and advantages of the invention will be better understood from the following description taken in connection with the accompanying drawing in which.

Figure 1:
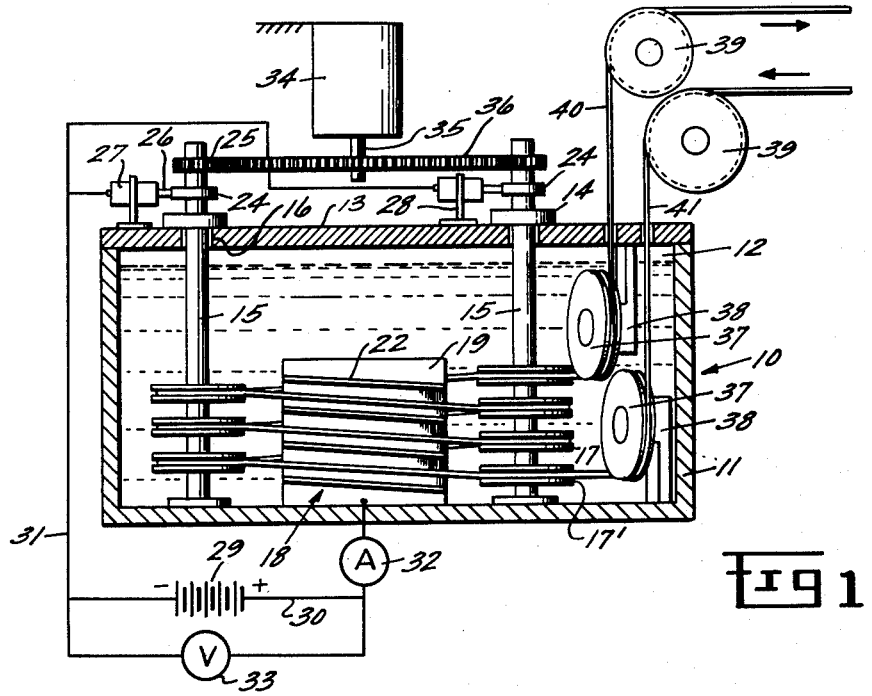
FIG. 1 is a schematic view of an electrodeposition cell embodying my invention.

In FIG. 1, an electrodeposition cell shown generally at 10 comprises a tank 11 having an inner insulated coating of plastic such as polyvinyl chloride and containing a plating bath. An upper open end 12 of tank 11 is covered by a removable lid 13 of Teflon or Lucite which supports a pair of spaced, insulated bearings 14 thereon. An electrically conductive shaft 15 whose surface is insulated with a suitable coating such as polyvinyl chloride is mounted rotatably in each of bearings 14 and extends downwardly through an aperture 16 in lid 13. An additional bearing is positioned at the opposite end of each shaft 15 to support each shaft 15 against the inner bottom wall of tank 11. A plurality of electrically conductive pulleys 17 are also protectively coated except at the rim grooves and mounted alternately on each shaft 15 to provide electrically conductive cathodes for the cell. Pulley 17' is non-conductive. An anode assembly 18 is positioned between shafts 15 in tank 11 and supported preferably from lid 13 by any suitable means (not shown).

Figure 2:
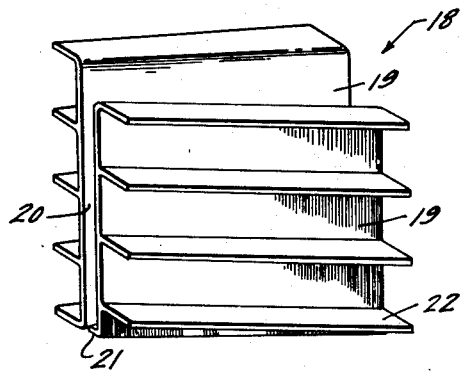
FIG. 2 is a perspective view of the anode assembly shown in FIG. 1.

As is best shown in FIG. 2, anode assembly 18 comprises a pair of electrically conductive sheets 19 which are spaced apart at 20 and joined at their lower ends by a flange 21. A plurality of electrically conductive plates 22 are affixed generally perpendicular on at least one surface of each sheet 19. Plates 22 are adapted to provide passages between adjacent plates and are positioned to align each passage with a pair of spaced pulleys. While a pair of sheets 19 are disclosed, a single sheet or a plurality of such sheets might be employed in the anode assembly. Similarly, the number and arrangement of the shafts 15 and pulleys 17 might likewise be varied.

Figure 3:
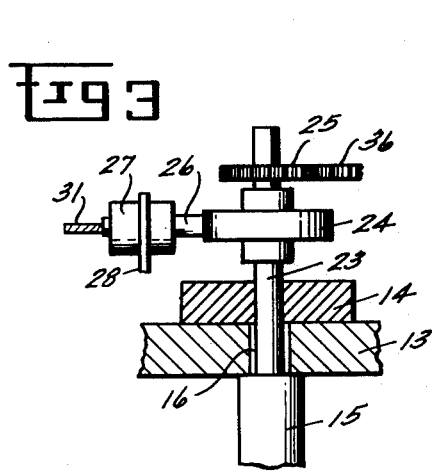
FIG. 3 is an enlarged view of the upper end of one of the shafts shown in FIG. 1.

As is best shown in FIG. 3, the upper portion of each shaft 15 has a reduced portion 23 which extends through opening 16 in lid 13. An insulated bearing 14 is provided on the upper surface of lid 13 so that reduced shaft portion 23 is rotatable within this bearing. Reduced shaft portion 23 carries a slip ring 24 and a toothed gear 25 near its upper end. A collector brush 26 is positioned adjacent slip ring 24 and in contact therewith.

As is best shown in FIG. 1, a brush-holder 27 is mounted by means of a support 28 on the upper surface of lid 13. A battery 29 provides current through a positive lead 30 to anode assembly 18 and through a negative lead 31, brush 26, and slip ring 24 to cathode pulleys 15. An ammeter 32 and a voltmeter 33 monitor the current. A motor 34 is supported in any suitable manner and provided with a shaft 35 which cooperates with a belt 36. Both toothed gears 25 are engaged by belt 36 to rotate shafts 15 with pulleys 17 thereon. The chrome plating bath in cell 11 is prepared preferably with four liters of water, 1350 grams of chromic acid and 0.0075 liter of 96% sulphuric acid and maintained at a temperature at between 40° C. and 50° C. to provide a suitable bath for chrome plating an electrical conductor in accordance with copending applications Serial Numbers 726,267 and 759,915, identified hereinabove.

A first insulated pulley 37, preferably made of Teflon or other suitable plastic, is positioned on an insulated plastic or plastic coated support 38 affixed to tank 11. A second insulated pulley 37 is positioned on a support 38 affixed to the inner surface of lid 13. A pair of insulated pulleys 39 are positioned outside tank 11 to convey an electrical conductor 40 into, through and out of the plating bath therein. Small apertures 41 are provided in lid 13 to accommodate conductor 40.

In the operation of electrodeposition cell 10, a conductor 40 travels over a first pulley 39 through an aperture 41 in lid 13 into the plating bath within tank 11, around insulated pulley 37, and onto the lowermost pulley 17' on shaft 15. Motor 34 drives belt 36 through shaft 35 to turn shafts 15 with asociated pulleys 17 ansd 17' at a uniform rate of speed. From pulley 17', conductor 40 passes between an adjacent pair of plates 22 on anode assembly 18 to an alternately stacked pulley 17 on the oppositely spaced shaft 15. Conductor 40 travels through a plurality of anode passages until it is wound around another insulated pulley 37 mounted on the inner surface of lid 13. From this pulley 37 conductor 40 travels through an aperture 41 in lid 13 and is wound over pulley 39 to be collected on a drum or fed through a further step in a coating process.

As set forth in the above-identfiied copending applications, three cathode pulleys with two anodes spaced therebetween were employed to chrome plate the conductor. The conductor supplied the necessary force to turn the cathode pulleys and the pulley bearings carried the current. The present invention reduces metallic contamination, bearing corrosion, eliminates interference with current flow between the shaft and pulley, and reduces bearing wear and friction loading. In the previous copending applications, conductor speed was about 2 feet per minute. The present electrodeposition cell increases the conductor speed since, for example, the embodiment disclosed in FIG. 1 provides the equivalent of six individual anodes. It is desirable also to hold the plating bath surface in tank 11 at a slightly negative pressure by a suction line (not shown) to keep plating vapors from escaping into the room where the electrodeposition cell is in operation.

The cross section current density of the conductor which is necessary for a satisfactory chromium plate with reasonable speed is sufficiently high to produce a red heat and oxidize the conductor if it was contacted in air prior to entering the plating bath. Current of 0.5 ampere per mil diameter of conductor might be employed for each eight inches of anode length. For example, if a 0.005-inch diameter conductor was used in a process which employed the present electrodeposition cell having six anodes, the conductor contacted at only one end would have to conduct a current of 15 amperes. For this reason, a plurality of cathode pulleys are used in the plating bath to contact the conductor to distribute the current along the conductor. The conductor is anodic with respect to the cathode pulleys because of the voltage drop at the pulley-conductor contact surface. This results in the conductor surface being etched into the bath at each contact. To prevent metallic contamination of the bath, the conductor must not be contacted electrically before it is passed through the first anode and becomes plated with chromium.

It is desirable that all metallic surfaces in contact with the plating bath except the lead anodes be plated with chromium or protected cathodically during contact with the bath, and that such surface be kept to a minimum consistent with being able to contact the conductor. As mentioned above, the inner surface of the tank is insulated with a coating which is not effected by the chromic acid bath. Under proper operating conditions, all cathode surfaces exposed to the bath become plated with chromium, eliminating the etching of the pulley base metal into the bath. Since the lid supports the pulley, shafts and anode assembly, the tank may be raised and lowered independently by some suitable means, such as a jack, or, alternatively, the electrolyte may be drained from tank 11. Thus, when the process is not in operation, the tank is lowered so that the electrolyte does not contact the lid assembly, preventing electrolytic corrosion of anode and cathode structures and contamination of the plating bath.

While other modifications of this invention and variations of apparatus which may be employed within the scope of the invention have not been described, the invention is intended to include all such as may be embraced with the following claims.

What I claim as new and desire to secure by Letters Patent of the United States is:

1. An electrodeposition cell comprising an insulated tank adapted to contain a plating bath, said tank having a bottom wall, a plurality of insulated bearings positioned in said tank and spaced from each other, an electrically conductive and surface insulated shaft mounted rotatably in each of said bearings, each of said shafts positioned perpendicular to said bottom wall, a plurality of electrically conductive and surface insulated pulleys with exposed rim grooves mounted alternately on each shaft, an anode assembly positioned between said shafts, said anode assembly comprising at least one electrically conductive sheet positioned perpendicular to said bottom wall, a plurality of electrically conductive plates affixed generally perpendicular to and on at least one surface of said sheet and adapted to provide passages between adjacent plates, said plates positioned to align each said passage with a pair of spaced pulleys, said pulleys adapted to convey a conductor through the plating bath in said tank, a slip ring positioned on each of said shafts, driving means for at least one of said shafts, a collector brush positioned adjacent to each slip ring and in contact therewith, a power source, and electrical circuit means connecting said collector brushes and said anode assembly with said power source.

2. An electrodeposition cell comprising an insulated tank adapted to contain a plating bath, said tank having a bottom wall, a plurality of insulated bearings positioned in said tank and spaced from each other, an electrically conductive and surface insulated shaft mounted rotatably in each of said bearings, each of said shafts positioned perpendicular to said bottom wall, a plurality of electrically conductive and surface insulated pulleys with exposed rim grooves mounted alternately on each shaft, an anode assembly positioned between said shafts, said anode assembly comprising a plurality of electrically conductive sheets positioned perpendicular to said bottom wall, a plurality of electrically conductive plates affixed generally perpendicular to and on at least one surface of each of said sheets and adapted to provide passages between adjacent plates, said plates positioned to align each said passage with a pair of spaced pulleys, said pulleys adapted to convey a conductor through the plating bath in said tank, a slip ring positioned on each of said shafts, driving means for at least one of said shafts, a collector brush positioned adjacent to each slip ring and in contact therewith, a power source, and electrical circuit means connecting said collector positions and said anode assembly with said power source.

3. An electrodeposition cell comprising an insulated tank having an open upper end, said tank having a bottom wall, said tank adapted to contain a plating bath, a removable lid positioned on the open end of said tank, a plurality of insulated bearings positioned in said tank and spaced from each other, an electrically conductive and surface insulated shaft mounted rotatably in each of said bearings, each of said shafts positioned perpendicular to said bottom wall, a plurality of electrically conductive and surface insulated pulleys with exposed rim grooves mounted alternately on each shaft, an anode assembly positioned between said shafts, said anode assembly comprising at least one electrically conductive sheet positioned perpendicular to said bottom wall, a plurality of electrically conductive plates affixed generally perpendicular to and on at least one surface of each of said sheets and adapted to provide passages between adjacent plates, said plates positioned to align each said passage with a pair of spaced pulleys, said pulleys adapted to convey a conductor through the plating bath in said tank, a slip ring positioned on each of said shafts, driving means for at least one of said shafts, a collector brush positioned adjacent each slip ring and in contact therewith, a power source, and electrical circuit means conecting said collector brushes and said anode assembly with said power source.

4. An electrodeposition cell comprising an insulated tank having an open upper end, said tank having a bottom wall, said tank adapted to contain a plating bath, a removable lid with spaced apertures therein positioned on the open end of said tank, an insulated bearing positioned on the upper surface of said lid and surrounding each of said apertures, an electrically conductive and surface insulated shaft mounted rotatably in each of said bearings and extending downwardly through one of said apertures, each of said shafts positioned perpendicular to said bottom wall, an insulated bearing positioned at the opposite end of each of said shafts within said tank on said bottom wall, a plurality of electrically conductive and surface insulated pulleys with exposed rim grooves mounted alternately on each shaft, an anode assembly positioned between said shafts, said anode assembly comprising of a plurality of electrically conductive sheets positioned perpendicular to said bottom wall, a plurality of electrically conductive plates affixed generally perpendicular to and on at least one surface of each of said sheets and adapted to provide passages between adjacent plates, said plates positioned to align each said passages with a pair of spaced pulleys, said pulleys adapted to convey a conductor through the plating bath in said tank, a slip ring positioned on each of said shafts outside said tank, a toothed gear positioned on each of said shafts, driving means for said toothed gears, a collector brush positioned adjacent to each slip ring and in contact therewith, a power source, and electrical circuit means connecting said collector brushes and said anode assembly with said power source.

5. An electrodeposition cell comprising an insulated tank having an open upper end, said tank having a bottom wall, said tank adapted to contain a plating bath, a removable lid with a pair of spaced apertures therein positioned on the open upper end of said tank, insulated bearings positioned on the upper surface of said lid and surrounding its associated aperture, an electrically conductive and surface insulated shaft mounted rotatably in each of said bearings and extending downwardly through one of said apertures, each of said shafts positioned perpendicular to said bottom wall, an insulated bearing positioned at the opposite end of each of said shafts within said tank on said bottom wall, a plurality of electrically conductive and surface insulated pulleys with exposed rim grooves mounted alternately on each shaft, an anode assembly positioned between said shafts, said anode assembly comprising a pair of electrically conductive sheets positioned perpendicular to said bottom wall, a plurality of electrically conductive plates affixed generally perpendicular to and on the exterior surface of each of said sheets and adapted to provide passages between adjacent plates, said plates positioned to align each said passage with a pair of spaced pulleys, a pair of insulated pulleys mounted in said tank, said pulleys adapted to convey a conductor through the plating bath in said tank, a slip ring positioned on each of said shafts outside said tank, toothed gear positioned on each of said shafts, driving means for said toothed gears, a collector brush positioned adjacent to each slip ring and in contact therewith, a power source, and electrical circuit means connecting said collector brushes and said anode assembly with said power source.

6. An electrodeposition cell comprising,
   (a) an insulated tank adapted to contain a plating bath,
   (b) said tank having a bottom wall,
   (c) a plurality of insulated bearings positioned in said tank and spaced from each other,
   (d) an electrically conductive and surface insulated shaft mounted rotatably in each of said bearings and positioned perpendicular to and on said bottom wall,
   (e) a plurality of electrically conductive and surface insulated pulleys with exposed rim grooves mounted alternately on each shaft,
   (f) an anode assembly positioned between said shafts and adjacent said bottom wall,
   (g) said anode assembly having at least one electrically conductive sheet generally perpendicular to said bottom wall,
   (h) a plurality of spaced apart and generally parallel electrically conductive plates affixed generally perpendicular on at least one surface of said sheet in non-parallel relationship to said bottom wall and adapted to provide passages between adjacent plates,
   (i) said plates positioned to align each of said passages with a pair of spaced alternate pulleys,
   (j) said pulleys adapted to convey a conductor through the plating bath in said tank,
   (k) a slip ring positioned on each of said shafts,
   (l) driving means for at least one of said shafts,
   (m) a collector brush adjacent to each slip ring and in contact therewith,
   (n) a power source, and
   (o) electrical circuit means connecting said collector brushes and said anode assembly with said power source.

References Cited in the file of this patent

UNITED STATES PATENTS

| 830,093 | Meaker | Sept. 4, 1906 |
| 2,494,954 | Mason et al. | Jan. 17, 1950 |

FOREIGN PATENTS

| 9,214 | Great Britain of 1886 | May 31, 1887 |
| 11,547 | Great Britain of 1895 | May 30, 1896 |
| 6,527 | Great Britain of 1908 | Nov. 26, 1908 |
| 603,915 | Great Britain | June 24, 1948 |
| 268,541 | Switzerland | Sept. 1, 1950 |